(12) United States Patent
Deshpande et al.

(10) Patent No.: US 9,355,481 B2
(45) Date of Patent: May 31, 2016

(54) DYNAMIC VISUALIZATION FOR OPTIMIZATION PROCESSES

(71) Applicant: GLOBAL FOUNDRIES INC., Grand Cayman (KY)

(72) Inventors: Deepak A. Deshpande, Pune (IN); Karanbir S. Gujral, Pune (IN)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/319,303

(22) Filed: Jun. 30, 2014

(65) Prior Publication Data

US 2015/0145867 A1     May 28, 2015

Related U.S. Application Data

(63) Continuation of application No. 14/091,833, filed on Nov. 27, 2013.

(51) Int. Cl.
    *G06T 11/20*     (2006.01)
    *G06Q 10/06*     (2012.01)

(52) U.S. Cl.
    CPC .............. *G06T 11/206* (2013.01); *G06Q 10/06* (2013.01)

(58) Field of Classification Search
    None
    See application file for complete search history.

(56) References Cited

U.S. PATENT DOCUMENTS

| | | | |
|---|---|---|---|
| 6,819,344 B2 * | 11/2004 | Robbins | G06T 11/206 345/441 |
| 8,127,245 B2 * | 2/2012 | Riss | G06F 3/04815 715/782 |
| 8,442,852 B2 | 5/2013 | Sun et al. | |
| 2005/0097536 A1 | 5/2005 | Bernstein et al. | |
| 2011/0090236 A1 | 4/2011 | Calsyn et al. | |
| 2012/0151399 A1 | 6/2012 | Soerensen et al. | |
| 2012/0253891 A1 | 10/2012 | Hayes et al. | |

FOREIGN PATENT DOCUMENTS

WO     2012149610 A1     11/2012

OTHER PUBLICATIONS

Agrawal et al., "Intuitive Visualization of Pareto Frontier for Multi-Objective Optimization in n-Dimentional Performance Space", American Institute of Aeronautics and Astronautics, 2004, pp. 1-11.
Liebscher et al., "Decision Making in Multi-Objective Optimization for Industrial Applications—Data Mining and Visualization of Pareto Data", 8th World Congress on Structural and Multidisciplinary Optimization, 2009, pp. 1-17.

(Continued)

*Primary Examiner* — Said Broome
(74) *Attorney, Agent, or Firm* — Scully Scott Murphy and Presser

(57) ABSTRACT

Embodiments of the present invention include a method, computer program product, and system for generating a visualization of an optimized project. The computer receives a project and a period of interest associated with the project. The computer determines a constraint status for each constraint associated with the project. The computer generates a graphical element that illustrates the constraint status. The computer generates a visualization of the project during the period of interest, wherein the visualization includes concentric geometric structures and the graphical element.

12 Claims, 4 Drawing Sheets

(56) References Cited

OTHER PUBLICATIONS

"Improving Visualization: Bullseye Bubble Chart", http://www.improving-visualisation.org/vis/id=291, dataviz, 2009, pp. 1-2.

"Defining, Solving, and Assessing Optimization Problems", http://www.mathworks.in/products/global-optimization/description2.html, Global Optimization Toolbox, Copyright 1994-2013, The MathWorks, Inc., pp. 1-3.

"Multidimensional Data Analysis for Multiparametric Optimization Problems Using Visualization Methods", http://webcache.googleusercontent.com/search?q=cache:tloBPv4111gJ.sv-journal.com/2012-2/01.php%3Flang%3Den+&cd=1&hl=en&ct=clnk&gl=in, 2012, vol. 4, No. 2, pp. 1-13 (document provided is a snapshot of the page as it appeared on Sep. 6, 2013).

U.S. Appl. No. 14/091,833, filed Nov. 27, 2013, Title of Invention: Dynamic Visualization for Optimization Processes.

* cited by examiner

DYNAMIC VISUALIZATION FOR OPTIMIZATION PROCESSES

FIELD OF THE INVENTION

The present invention relates generally to the field of visualization and more particularly to n-variable optimization process visualization.

BACKGROUND OF THE INVENTION

The field of visualization continues to evolve and provide new and better ways of communicating increasingly complex systems in a readily understandable way. In part, this growth has been fueled by the proliferation of computing devices, both at home and in a mobile environment (smart phones, tablets, notebooks, e-readers, etc.), that allow improved real-time viewing of complex; multi-subject, multicolor visualizations. Software applications and programs designed to run on both office and mobile computing devices allow users to perform a wide variety of functions that may be viewed using visualizations including business applications, analysis, school work, entertainment, and other information. Complex systems can be depicted using visualization. Infographics and information visualizations, for example are representations of information, data or knowledge intended to present complex information quickly and clearly. Dashboards, mind-maps, and similar visualization formats combining multiple graph forms and/or multiple sets of information in a visualization allow for rapid visual assimilation of complex data.

SUMMARY

Embodiments of the present invention include a method, computer program product, and system for generating a visualization of an optimized project. The computer receives a project and a period of interest associated with the project. The computer determines a constraint status for each constraint associated with the project. The computer generates a graphical element that illustrates the constraint status. The computer generates a visualization of the project during the period of interest, wherein the visualization includes concentric geometric structures and the graphical element.

DETAILED DESCRIPTION

Figure 1:
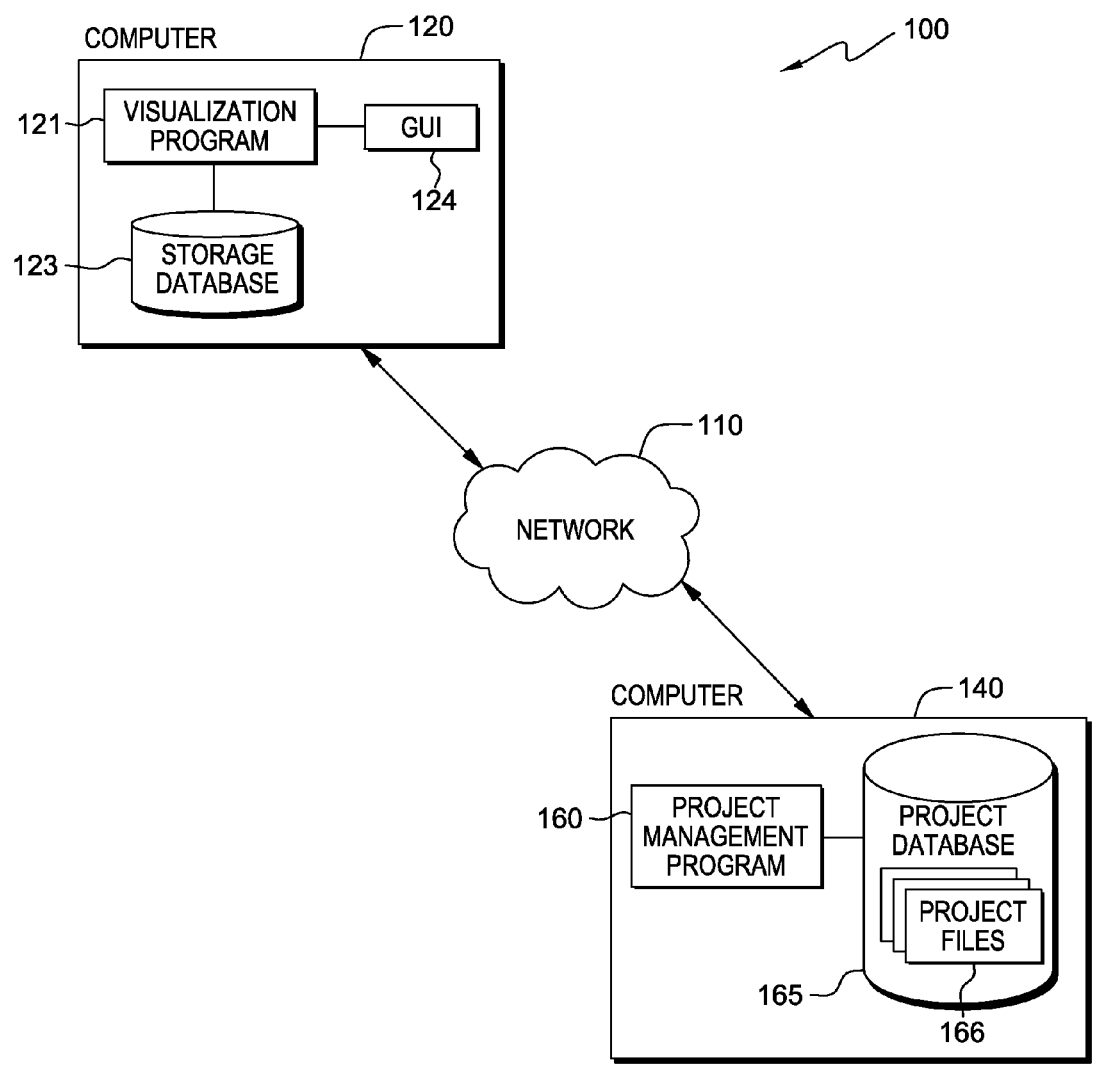
FIG. 1 is a functional block diagram illustrating a distributed data processing environment, in accordance with an embodiment of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module" or "system". Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java™, Smalltalk, C++ or the like and conventional procedural programming languages, such as the "C" programming language or similar programming languages. The program code may execute entirely on a user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

A n-variable optimization problem is a complex problem that requires the management or optimization of multiple variables, which may have one or more constraints that make finding an optimum solution much more difficult. To achieve an optimum solution or goal, for example a scheduled software release, a large number of variables must be managed usually within a set of constraints such as budget, available programming resources, and available hardware resources. Manageable constraints include maximum values, for example a budget, or maximum allowable defect rate, and minimum values, for example the minimum required customer set. N-constraint optimization or other optimization techniques can be utilized to provide an optimal solution that balances resources to achieve a timely and cost-effective solution to a complex problem.

Projects may be optimized once or repeatedly, for example, at the beginning or end of a project phase, quarterly, monthly, or on an as needed basis. Embodiments of the present invention provide visualizations that improve comprehension of the progress of a project by graphically representing the status of the individual constraints and their associated progress to a target. The graphical representation provides a real-time comparison of a constraint's actual progress to the scheduled progress. The status of a constraint reflects the constraint's rate of change or velocity over an predetermined time. The graphical representation may aide in the allocation and the management of resources for a project.

The present invention will now be described in detail with reference to the Figures. FIG. 1 is a functional block diagram illustrating a distributed data processing environment, generally designated 100, in accordance with one embodiment of the present invention. Data processing environment 100 includes computer 120 and computer 140 connected over network 110, in accordance with an embodiment of the present invention.

Network 110 can be, for example, a local area network (LAN), a virtual LAN (VLAN), a wide area network (WAN), such as the Internet, or a combination of these, and can include wired, wireless, or fiber optic connections. Network 110 may be a distributed computing environment utilizing clustered computers and components that act as a single pool of seamless resources, as is common in data centers and with cloud computing applications or "clouds". In general, network 110 can be any combination of connections and protocols that will support communications between computer 120 and computer 140, in accordance with an embodiment of the present invention.

Computer 140 is a computing device that houses information associated with projects, in accordance with an embodiment of the present invention. Computer 140 can be a personal computer (PC), a laptop computer, a tablet computer, a netbook computer, a desktop computer, a personal digital assistant (PDA), a smart phone, or any programmable electronic device capable of executing project management program 160 and communicating with visualization program 121 on computer 120 via network 110. Computer 140 includes project file 166, project database 165, and project management program 160 that tracks program management to target goals, variables, and constraint status for a complex project using a n-variable optimization process.

Computer 120 is a computing device that generates visualizations of project constraints, in accordance with an embodiment of the present invention. Computer 120 can be a personal computer (PC), a laptop computer, a tablet computer, a netbook computer, a desktop computer, a personal digital assistant (PDA), a smart phone, or any programmable electronic device capable of executing visualization program 121 and communicating with project management program 160 on computer 140 via network 110. Computer 120 includes visualization program 121, which is in communication with storage database 123 and graphical user interface (GUI) 124. In some embodiments, computer 120 is a server computer, providing visualizations to computer 140 and other computing devices. Computer 120 communicates with computer 140 utilizing network 110. Computer 120 may include internal and external hardware components, as depicted and described in further detail with respect to FIG. 4.

Visualization program 121 generates visualization using data received from project management program 160. Visualization program 121 receives user input, for example, via GUI 124, for the desired time period of interest and project name to be visualized. Visualization program 121 uses the desired period of interest and project name to request the constraint status for the project from project management program 160. Project management program 160 retrieves constraint status information from project files 166 and transmits the constraint status to visualization program 121 on computer 120 via network 110. Visualization program 121 generates a visualization that reflects a project's current status along with a dynamic view of the progress of each constraint. In an embodiment, the dynamic view illustrates the velocity or rate of change of a constraint or element during a time period of interest. The velocity is illustrated by trailing structures, such as a circle, wherein the number of trailing structures depicted behind the graphical element for the constraint. The velocity of each constraint in the time period of interest may be determined by taking current constraint status subtracted from the constraint status at the start of the time period of interest and dividing this number by the constraint project target. This will give a ratio or number that can be used as a normalized velocity for the constraint. For constraints that are decreasing, for example defect rates, the current status may be subtracted from the status at the start of the time period of interest.

In other embodiments visualization program 121 may be installed or stored on a local, remote, or cloud-based server, and users may access it by any computing device via network 110.

Figure 2:
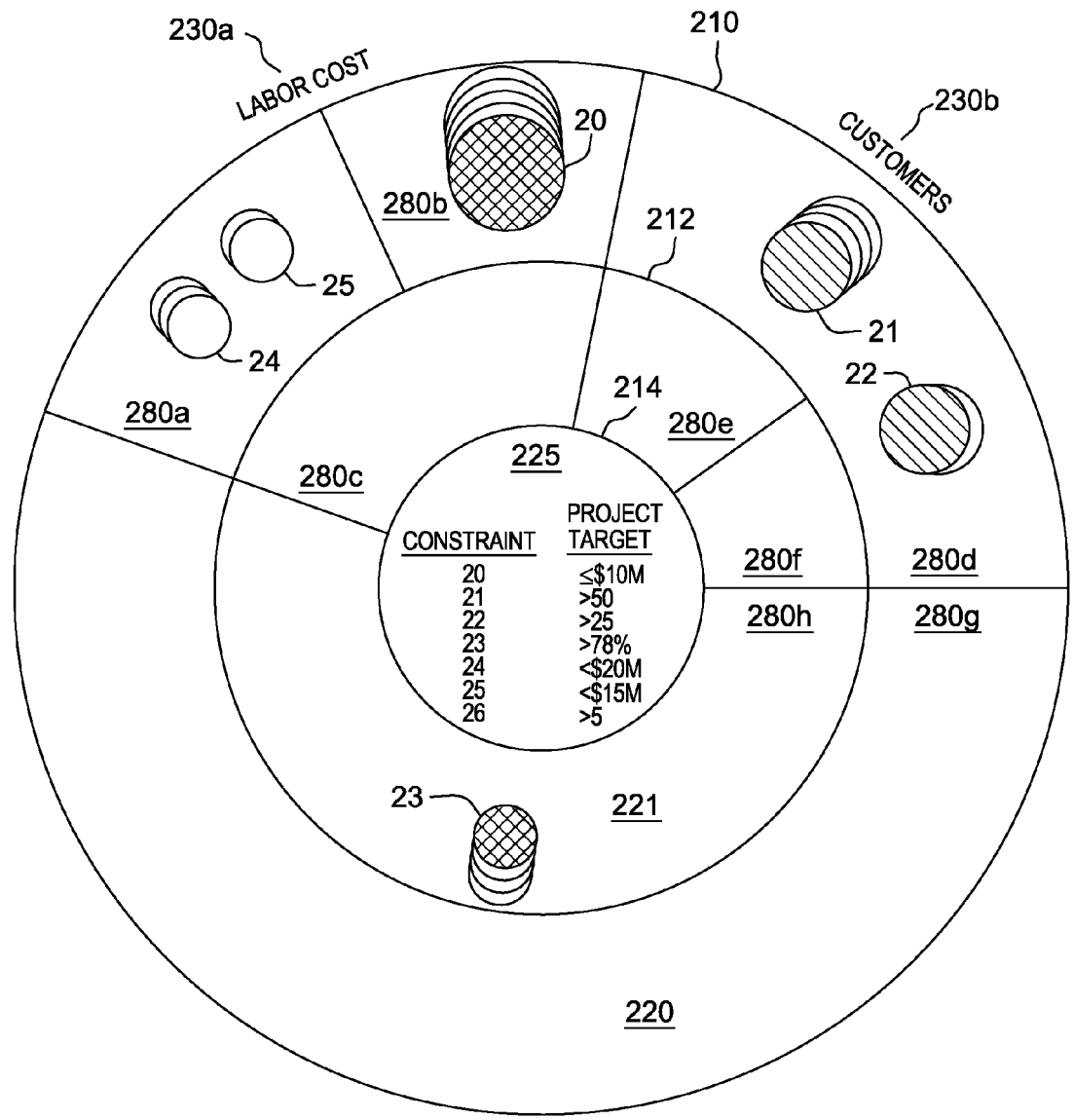
FIG. 2 is an exemplary visualization, in accordance with an embodiment of the present invention.
Figure 2:
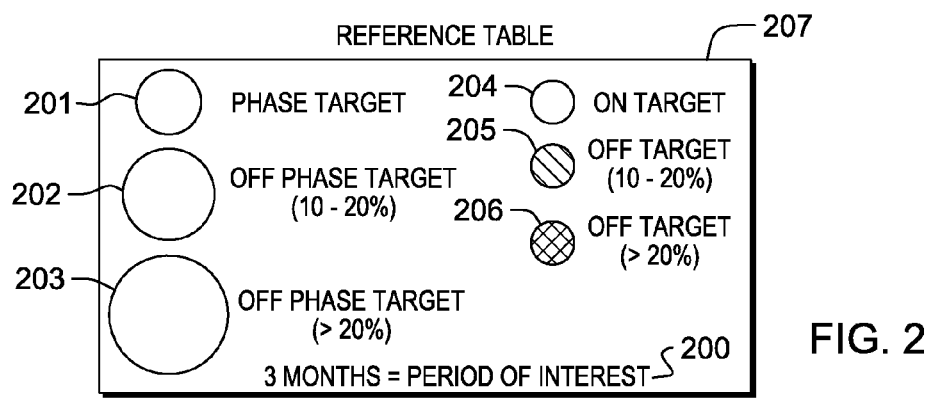

FIG. 2 is an illustration of a visualization, generally 200, created by visualization program 121, in accordance with an embodiment of the present invention. Visualization 200 depicts the constraints used in an optimization process of a project, for example, project XYZ, to show a visual overview of the project's status. Specifically, visualization 200 illustrates the current status of constraints compared to the overall planned project schedule and a comparison to the current phase schedule for the constraint.

Additionally, visualization 200 illustrates the rate of change of a constraint over a predetermined time period of interest. Visualization 200 uses graphical elements to depict constraints. Reference table 207 reflects the variations of graphical elements that represent constraint status. The variations of the graphical element illustrate each constraint's progress as compared to the planned project schedule and the planned phase schedule or targets for that constraint. The reference table may show the time period of interest used to determine the velocity constraint.

Although visualization 200 is depicted with concentric circular structures, visualization 200 can utilize other concentric geometric structures, such as quadrilateral, triangle, or any multi-sided geometric structure. Visualization 200 includes co-centric circles 210, 212 and 214, which create rings 220, 221 and circle 225. Ring 220 and ring 221 each represent a phase, a stage, or a timeframe in a project. Circle 225 may include a list of project targets or goals for a constraint. Targets may be a maximum, minimum, or finite value. Additionally, a phase may have individual constraint targets that are not shown as a part of the overall project plan.

For example, a project for cloud capacity optimization has annual targets for a cloud administrator. The annual targets are defined in terms of return on investment (hereinafter "ROI") for their service level agreements (hereinafter "SLA"). The goals for ROI are defined semi-annually. For example, ring 220 illustrates the first half of the annual plan and ring 221 illustrates the second half of the annual plan.

A phase may be bisected by lines that sub-divide the phase into categories and sub-sections. A category can be, for example, a wedge created by two lines radiating from circle 225 to circle 210. A category is a group or a classification for a subject, a topic, a type of action, or a logical grouping of elements or constraints in a project, such as capacity utilization 230c, which includes constraint 23 for capacity utilization.

A category may be divided into one or more sub-sections. A sub-section is a more granular grouping of one or more similar or related constraints or elements by phase. For example, in the cloud capacity optimization previously discussed, sub-section 280a and sub-section 280b are sub-sections of a category for cost, cost 230a in phase 221. In sub-section 280a, constraint 24 for labor cost and constraint 25 for infrastructure cost are grouped together in phase 221 (first half of the annual plan), while constraint 20 for hardware cost are located in sub-section 280b in phase 221.

Circle 212 divides categories 230a, 230b, and 230c into sub-sections by phase. Sub-sections 280a, b, c, d, e, f, g, and h are examples of categories divided into sub-sections by phase.

While FIG. 2 is shown in a traditional bull's eye format, the visualizations generated by visualization program 121 are not limited to a bull's eye format. In certain embodiments of the present invention, visualization program 121 may use a linear progression or series of bars, squares, or a timeline to illustrate phases of a project. Additionally, in some embodiments, a constraint may initiate movement from the center of a visualization and progress outward. For example, in FIG. 2, the first phase could be phase 221, and the project progresses outward to phase 221. Constraint project goals or targets may be listed outside of the final circle indicating the last phase. Listing the constraint goals or targets outside of the outer circle may be helpful for clarity or ease of reading in projects with a large number of constraints.

As a project progresses, in some cases, a sub-section or sub-sections and/or one or more constraints may be eliminated thereby returning the subsection to the concentric structure. This occurs when a line bisecting the next ring or phase is deleted or a constraint is eliminated in the next phase. An example of the elimination of a sub-section and a constraint is depicted in the category for cost 230a. Sub-section 280b is eliminated in phase 221. In phase 221 of category cost 230a, constraint 20 for hardware cost is eliminated. No hardware purchases are planned in the second half of the annual plan. Therefore, constraint 20 for hardware cost and sub-section 280b will not be present in phase 221.

Graphical elements representing constraint status may be added to categories and sub-sections. In the cloud capacity optimization project discussed previously, the optimization process uses five (5) constraints which are illustrated as graphical elements 20, 21, 22, 23, 24, and 25 in phase 220.

The status of a project in a visualization is shown by the graphical elements representing the status of each constraint used in the optimized project. The status of a constraint is depicted by variations in the graphical element, such as the location of the graphical element in the phase, the graphical element size, the graphical element color, the graphical element shading or pattern, and the additions to the graphical element illustrating a velocity for each constraint. The variations to the graphical elements are further discussed below.

The location of constraint graphical element within a phase indicates the current progress of the constraint within the phase. For example, in the cloud capacity optimization with annual goals for ROI and quarterly phases, a constraint that is three (3) months into phase 221 would be placed halfway way through the bi-annual phase as illustrated by graphical element 24 for labor cost.

The size for a graphical element represents the progress of the constraint in the current phase as compared to the scheduled constraint phase progress. Reference table 207 provides a reference for viewing and understanding visualization 200. Reference 201 reflects constraints that are on-target compared to the constraint phase schedule for that point in time. Reference 24 labor cost is on-target for phase 221. Reference table 210 also shows sizes of constraints that are not meeting the constraint phase schedule and identifies an example of a range of constraint off-target values used to determine the size of the constraint. Constraints not meeting the scheduled constraint phase progress may be identified by larger graphical elements.

As an example, constraint 20 hardware cost is not achieving the scheduled constraint phase target for the constraint at this current point in the phase. Constraint 20 for hardware cost three (3) months into phase 1 is targeted for $10 million cost budget; however, the actual current hardware cost is $12.3 million. Constraint 20 exceeds the planned constraint phase target for three (3) months into the phase by 23% ($2.3 million excess divided by the $10 million target). Constraint 20 would be depicted by the largest constraint graphical element size in reference table 210, graphical element size 203.

Larger graphical elements allow the viewer to more quickly identify constraints that are not meeting planned constraint phase progress. In the exemplary embodiment, the more off-target the constraint is, the larger the graphical element will be, thus helping the user identify constraints that may require additional focus to achieve their phase targets. In other embodiments, graphical element sizes and constraint off-target ranges may be changed by the user and automatically updated in the reference table.

Some embodiments of the present invention may use the larger graphical element size to show the on-target constraints. The color or shading of a graphical element indicates the current status of a constraint as compared to the planned project schedule for the constraint. Examples of the patterns used to shade the graphical elements are illustrated in reference table 207 in FIG. 2. Reference table 207 includes references 201, 202, 203, 204, 205, and 206, which show the comparison of the current status of a constraint to the planned project constraint schedule. References 201, 202, 203, and 204 illustrate constraints that are on-target for the planned project schedule.

Reference table 205 illustrates a constraint that is off-target, for example, by 10-20%, to the planned project schedule. Reference 206 illustrates a constraint that is significantly (>20%) off target, for example, by greater than 20%, as compared to the planned project schedule. In other embodiments, the percent off-target used to determine size or patterns may be changed by the user.

Visualization program 121 may provide a pull down screen or menu that allows a user to select the granularity of the comparisons of current status to planned constraint schedules. For example, the menu may allow a user to select the range of the off-target percentages for a reference, or reference size, and the number of graphical elements to be used in the visualization. For example in FIG. 2 reference table 210 uses three (3) graphical element sizes and three (3) graphical element fill patterns to show the comparison of the current constraint status to the planned project and phase plan for the constraint.

In another embodiment, the off-target or on-target ranges are user defined. For example, a user could select an off-target value and target threshold of less than 15% resulting in two graphical element sizes and two fill patterns reflected in the reference table for that visualization. In some embodiments, graphical elements may include shading and/or color schemes, such as red, yellow, and green, may illustrate constraint progress relative to the planned project progress for the constraint.

In visualizing a project, there may situations where a constraint may be meeting the current constraint phase progression targets but not meeting the overall constraint project plan targets. For example, in the cloud capacity optimization project with annual and bi-annual targets previously discussed, constraint 23 for capacity utilization is shown as an example of a constraint that is meeting the phase plan but is off-target for the overall constraint project plan. If constraint 23 is three (3) months into phase 221 (½ way through) and is not meeting the scheduled phase 221 target for the three (3) month point, constraint 23 would be on-target for the phase as shown by on-target size 201. However, since constraint 23 entered phase 221 late at seven (7) months instead of the project schedule of entering phase 221 at six (6) months, constraint 23 is off-target for the overall plan and would be shown with pattern 206 a cross-hatched fill in the graphical element for constraint 23.

Additional aspects of a constraint's status may be illustrated by incorporating additional elements to the graphical element. For example, rate of change of a constraint over a desired period of interest is indicated in FIG. 2 with a series of trailing circles behind graphical elements, such as graphical elements 24, 25, 20, 21, and 22, wherein the number of graphical elements trailing the constraint graphical element. Hence, as the number of trailing graphical structures increases, the higher the velocity of the constraint. For example, constraint 21 in phase 220, which has three (3) trailing circles and has a greater velocity compared to constraint 22, which includes two (2) trailing circles. Therefore, constraint 21 is progressing at higher velocity over the period of interest. The detailed method of calculation of velocity calculation is discussed in FIG. 3. For purpose of illustration, FIG. 2 uses trailing circles; however, other geometric structures, such as triangles, bars, halos, outlines, or repeating shapes may be used. In some embodiments, the size of the additional element may indicate the velocity. For example, the length of a bar or circumstances of a circle may indicate velocity for a constraint.

A comparison of the current velocity of a constraint to the planned constraint velocity in the period of interest may be shown. For example, a trailing bar could be used to show the actual velocity of a constraint in a phase (an open bar, no shading) while another trailing bar could be used to show the planned velocity of the constraint in the period of interest (shaded bar). For example, a constraint that is on-target for the phase, such as reference 201, but has a much shorter actual velocity bar than the planned velocity bar for the constraint, may need additional focus or resources to remain on-target.

Visualizations generated by visualization program 121 provide a complete detailed view of the project by providing a status for each constraint. The visualizations give additional insight into the dynamics of the rate of constraint progress or the velocity of a constraint. Visualizations provided by visualization program 121 allow a user or viewer to quickly see the current status of a project by viewing the status of all the optimized constraints to be managed in the project.

The cloud capacity optimization project for an annual planning cycle with bi-annual goals in FIG. 2 is an example of a simplified project used for illustration purposes. Some of the projects illustrated by visualization program 121 may have many constraints. Additionally, some embodiments of the invention may have visualized projects with overlapping phases or stages in the development path or project plan as opposed to linear annual phases or bi-annual phases as shown in FIG. 2.

Visualizations produced by visualization program 121 provide quick, effective insight into the project status. Projects with many green constraints graphical elements which are on-target size (size 201) show a project progressing well to the project plan. Constraints that are not meeting the optimized project plan may be easily identified by color, by size (larger), and by location. Additional insight into a project's status and the rate of each constraint's progress is given by the number of trailing circles behind each constraint. The more trailing circles or additional elements, the faster the constraint is progressing in the period of interest. A constraint that is not meeting its planned targets and moving slowly with one trailing circle such as constraint 22, needs more focus than a constraint not meeting its target but moving quickly with a high velocity for example constraint 21 with three (3) trailing circles. Additionally, a visualization that shows many constraints that are off-target by size, location, and color may indicate additional resources are needed or that the project needs to be re-optimized to balance existing resources for the best or optimal outcome for the project.

Figure 3:
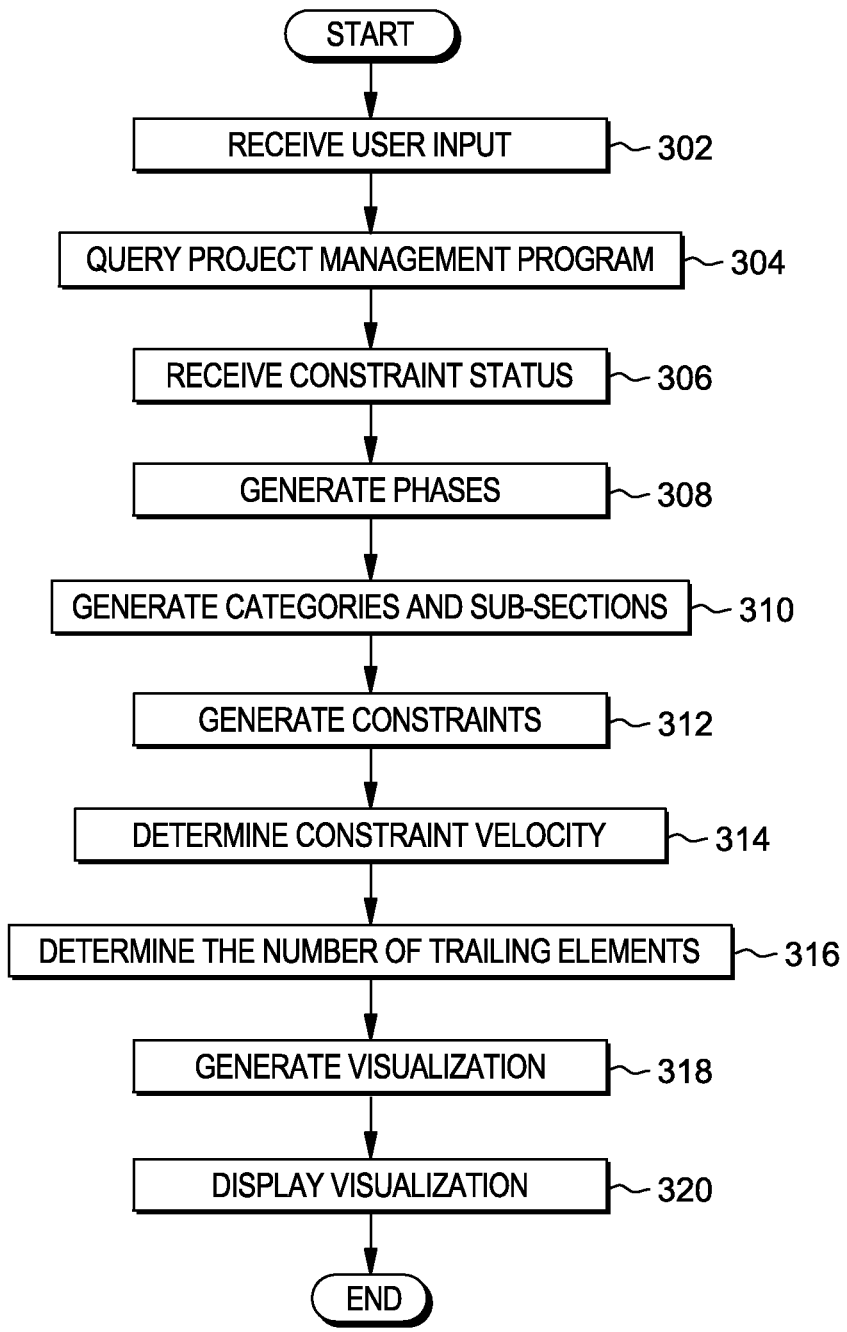
FIG. 3 is a flowchart depicting operational steps of a visualization program, in accordance with an embodiment of the present invention.

FIG. 3 is a flowchart depicting operational steps of visualization program 121, in accordance with an embodiment of the present invention.

In step 302, computer 120 receives user input on a time period of interest and project to be visualized via GUI 124. In step 304, computer 120 queries computer 140 for project status from program management program 160, which can access project file 166 in project database 165 for the constraint status. The constraint status includes the current status for each of the constraints, the current planned phase progress for each optimized constraint, the constraint planned project progress, and the status of each optimized constraint for the beginning and the end of the time period of interest.

In step 306, visualization program 121 receives constraint status for a project's constraints from project management program 160 on computer 140 via network 110. Constraint status may be received from a project management program on computer 120, from several programs, files, or databases on computer 120, 140, or other computing devices in communication via network 110. In other embodiments, the constraint status can be user defined.

Visualization program 121 generates the phases associated with the project (step 308).

Visualization program 121 generates categories and subsections that are associated with a project (step 310). Wedges may be generated within phases of visualization 200 to create subsections, for example, subsections 280a, 280b, 280g, and 280h. Additionally, additional sub-sections may also be added to visualization 200 by adding additional concentric structures.

Visualization program 121 generates graphical elements that are associated with project constraints (step 312).

Visualization program 121 determines the constraint's velocity over the time period of interest (step 314). For example, visualization program 121 receives the time period of interest from a user via GUI 124. Reference table 207 also includes period of interest (hereinafter "POI") 208, which reflects the predetermined period of interest used for determining and illustrating velocity.

Visualization program 121 determines the number trailing circles behind the constraint graphical element (step 316). Based on the constraint status received from project management program 160 via network 110, visualization program 121 determines a velocity for generating a trailing circle for the project to be visualized. For example, visualization program 121 receives the constraint status for the cloud optimization project in FIG. 2 and determines that 0.1 would be an appropriate velocity value to generate a trailing circle for velocity. Constraint 24 for labor cost grows from zero at the start of phase 220 to $4.8 million in the first three (3) months. The velocity for constraint 24 is $4.8M-$0.0M/$20M=0.24. Therefore, constraint 24 has two (2) trailing circles indicating its velocity in the time period of interest.

In some embodiments, the user may select a velocity number to use to represent a circle for the trailing circles indicating constraint velocity. This may be done with a pop-up screen with a velocity option to select from. For example, the pull-down menu on GUI 124 may offer 0.01, 0.05, 0.07, 0.1, and 0.2 as velocity choices for the user to select or click on.

In another embodiment of the present invention, a user may select to determine the velocity for generating a trailing circle by category. For example, in GUI 124 a user may select "determine velocity for circle by category" in a pull-down menu offering to determine velocity for circle by project or by category. Visualization program 121 may determine that the category for cost 230a uses 0.2 to generate a trailing circle and category 230b for customers uses 0.05 to generate a trailing circle to indicate the constraint velocity. Visualization program 121 generates the visualization (step 318).

Visualization program 121 displays the visualization using GUI 124 (step 320). In an embodiment, visualization program 121 may additionally create a file that contains the data to create the visualization. The visualization file may be stored in storage 123 on computer 120 or in other memory or databases on computer 120.

Figure 4:
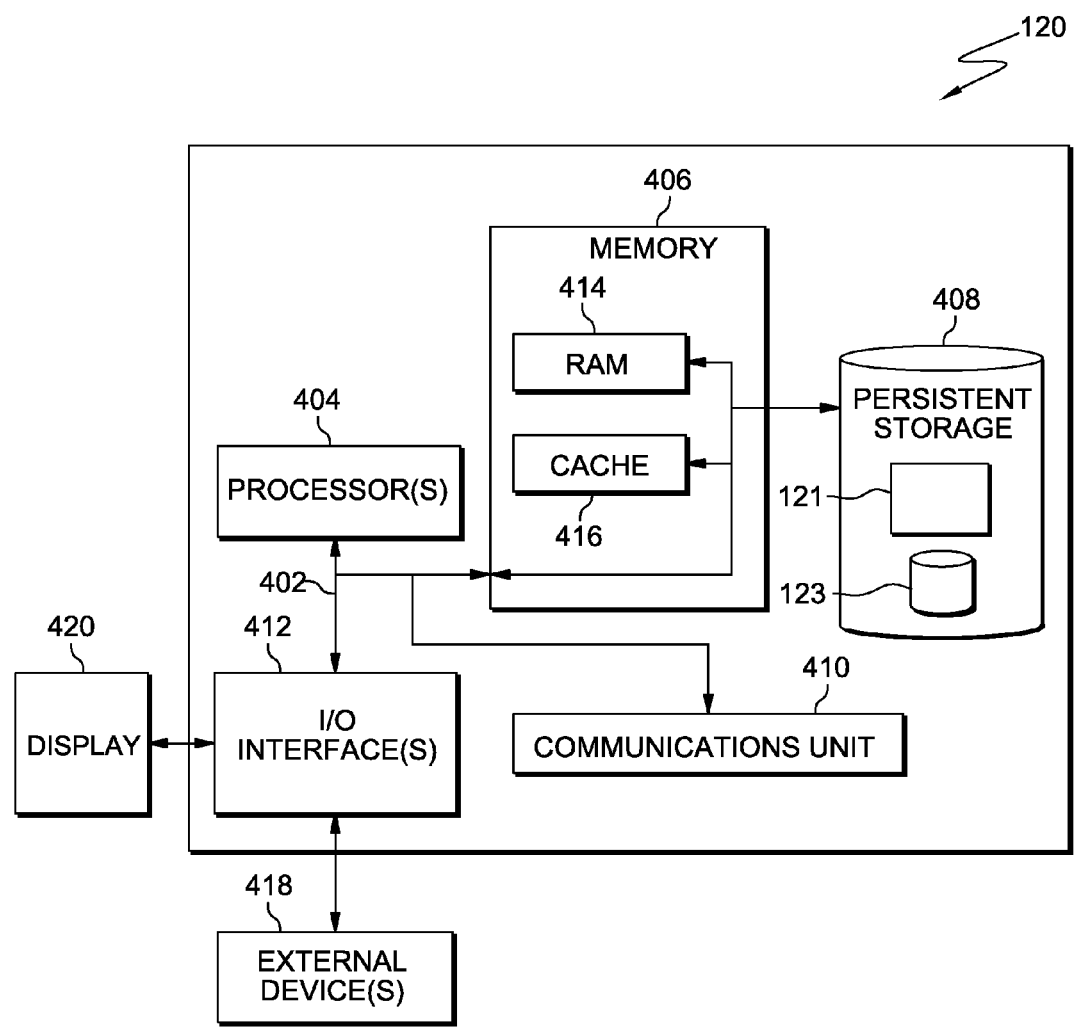
FIG. 4 depicts a block diagram of components of the computer, in accordance with an embodiment of the present invention.

FIG. 4 depicts a block diagram of components of computer 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 120 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (microprocessors, communications, and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Visualization program 121 and storage database 123 are stored in persistent storage 408 for execution by one or more of the respective computer processor(s) 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 110 and computer 140. In these examples, communications unit 410 includes one or more network interface cards. Communications unit 410 may provide communications through the use of either or both physical and wireless communications links. Visualization program 121 and storage 123 may be downloaded to persistent storage 408 through communications unit 410.

I/O interface(s) 412 allows for input and output of data with other devices that may be connected to computer 120. For example, I/O interface(s) 412 may provide a connection to external device(s) 418 such as a keyboard, a keypad, a touch screen, and/or some other suitable input device. External device(s) 418 can also include portable computer-readable storage media such as, for example, thumb drives, portable optical or magnetic disks, and memory cards. Software and data used to practice embodiments of the present invention, e.g., visualization program 121 and graphics storage 123 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for generating a visualization of an optimized project, the method comprising:
   receiving, by a computer system, data associated with a project, and a period of interest associated with the project, the data representing a plurality of project constraints;
   determining, by the computer system, a constraint status for each constraint associated with the project, the determining comprising: comparing, at said computer system, a constraint's actual status against a predetermined target status for that constraint and determining based on said comparison an extent to which the constraint is on target compared to the predetermined target status;
   generating a graphical element having a display attribute that illustrates the extent to which the constraint's actual status is on target compared to the predetermined target status for that constraint; and
   generating a visualization of the project during the period of interest via a graphical user interface in communication with said computer system, wherein the visualization includes concentric graphical structures representing project timeframes and the graphical element displayed at locations within the graphical structures, said graphical element attribute and locations within said structures indicating a dynamic view of a project status in the period of interest.

2. The method of claim 1, wherein the graphical element attribute reflects the constraint status using one or more of the following: size, coloring, shading, and pattern fill.

3. The method of claim 1, wherein a project constraint status indicates a progress of a project constraint, said method comprising:
   comparing, at said computer system, a constraint's current progress against a planned progress for that constraint in said time period; and
   determining based on said comparing, an extent to which the constraint's current progress is on target compared to the planned progress of said time period for the constraint; said generated graphic element displayed with an attribute indicating said extent that the current constraint velocity is on target.

4. The method of claim 1, wherein a project constraint status indicates a rate of change of a project constraint over the period of time, said method further comprising:
   comparing, at said computer system, a constraint's current rate of change in the period of interest against a planned constraint velocity for the period of interest; and
   determining based on said comparing, an extent to which the constraint's current rate of change is on target compared to the planned constraint rate of change for the time period; said generated graphic element displayed with an attribute indicating said extent that the current constraint velocity is on target.

5. The method of claim 4, further comprising:
   computing, by said computer system, a constraint's rate of change in said time period of interest as: a subtraction of a current constraint status from a constraint status at a start of said period of interest, and dividing a result of the subtraction by a constraint project target.

6. The method of claim 4, wherein the rate of change is depicted by a quantity of trailing structures associated with the graphical element, wherein the quantity of trailing structures is proportional to the rate of change.

7. The method of claim 4, wherein in response to a dynamic view indicating a graphical element having an attribute indicating that the constraint status is on-target for the period of interest but has a shorter actual constraint velocity than a planned constraint velocity for the period of interest, determining a need for additional resources for the constraint to remain on-target.

8. The method of claim 4, wherein in response to a dynamic view indicating a plurality of graphical elements each graphical element having an attribute indicating that the respective constraint status is off-target, determining one of: allocating additional resources for the project or a re-optimizing of the project to balance existing resources for an optimal project outcome.

9. The method of claim 1, further comprising:
   enabling, via said graphical user interface, user selection of a granularity of the comparing.

10. The method of claim 9, wherein a granularity of comparing represents one of: an on-target range or percentage, an off-target range or percentage, a reference size.

11. The method of claim 9, further enabling, via said graphical user interface, user selection of a number of graphical element attributes for use in the visualization.

12. The method of claim 6, further comprising:
   enabling, via said graphical user interface, user selection of a velocity value indicating a rate of change of a constraint status for a time period, said velocity value selection used to generated said quantity of trailing structures based on a determined rate of change for the constraint.

* * * * *